United States Patent
Tsuchiya et al.

(10) Patent No.: US 7,036,391 B2
(45) Date of Patent: May 2, 2006

(54) DIFFERENTIAL UNIT

(75) Inventors: Kenichi Tsuchiya, Tokyo-To (JP); Seiji Habara, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/090,754

(22) Filed: Mar. 6, 2002

(65) Prior Publication Data

US 2002/0124672 A1 Sep. 12, 2002

(30) Foreign Application Priority Data

Mar. 7, 2001 (JP) .............................. 2001-063174

(51) Int. Cl.
*B60K 17/24* (2006.01)
(52) U.S. Cl. ..................... 74/424; 384/520; 384/551
(58) Field of Classification Search ................. 74/424; 384/510, 520, 537, 559, 584, 551; 475/247
See application file for complete search history.

(56) References Cited

U.S. PATENT DOCUMENTS

| | | | |
|---|---|---|---|
| 1,556,875 A | 10/1925 | Ormsby | |
| 1,956,237 A | * 4/1934 | Hughes | 74/424 |
| 2,019,464 A | * 10/1935 | Riblet | 74/424 |
| RE20,149 E | * 10/1936 | Padgett et al. | 74/424 |
| 4,004,472 A | * 1/1977 | Millward et al. | 475/247 |
| 4,867,001 A | * 9/1989 | Sasaki et al. | 74/424 |
| 5,549,397 A | * 8/1996 | Rode | 384/551 |

FOREIGN PATENT DOCUMENTS

| | | |
|---|---|---|
| DE | 406049 | 11/1924 |
| EP | 0 476 458 A1 | 3/1992 |
| JP | 63-72915 | * 4/1988 |
| JP | 03-33539 | * 2/1991 |
| JP | 08-210472 | * 8/1996 |

* cited by examiner

*Primary Examiner*—William C. Joyce
(74) *Attorney, Agent, or Firm*—Smith Gambrell & Russell LLP

(57) ABSTRACT

A protruding section facing a drive pinion shaft is integrally provided on (or provided as a separate component) a tubular spacer interposed between an inner race of a pilot bearing and an inner race of a tapered roller bearing at an inner section opposite to the drive pinion shaft. In one embodiment, a monolithic protruding section is curved so as to be convex along the overall central axial direction of the spacer, and is arch shaped in cross section. The protruding section protrudes towards the drive pinion shaft along the overall inner peripheral direction of the spacer, and the inner surface of the protruding section comes into contact with or close to the outer surface of the drive pinion shaft. Additional positions include one or a plurality of O-rings interposed between the drive pinion shaft and the inner surface of the tubular spacer.

14 Claims, 7 Drawing Sheets

DIFFERENTIAL UNIT

BACKGROUND OF THE INVENTION

1. Technical Field

The present invention relates to a differential unit.

2. Related Art

Generally, in a drive system for an automobile, a differential unit is used in order to change a transmitting direction of a drive power by ninety degrees, and to carry out a final gear reduction and a differential function.

In the differential unit of the related art, as shown in FIG. 6, the differential unit 101 is provided with a drive pinion shaft 109 and a drive pinion (bevel pinion) meshing with a driven gear (not shown) at one end in a case 105 formed by a differential carrier 103 and a differential cover (not shown). The driven gear is rotatably supported in the differential carrier 103 by a differential mechanism (not shown) attached to the driven gear and by bearings (not shown), and mechanically connected to drive axles (not shown) for left and right wheels through the differential mechanism.

The drive pinion shaft 109 is rotatably supported on the differential carrier 103 by three bearings 113, 115 and 117. A companion flange 119 for linking the drive shafts (not shown) such as propeller shafts is fixed to another end of the drive pinion shaft 109 by spline fitting by using a nut 121. Cylindrical spacers 123 and 125 are interposed between inner races 113a, 115a and 117a of the three bearings 113, 115 and 117 as rotatably mounted on the drive pinion 109 in order to regulate attachment positions of the respective bearings 113, 115 and 117. The spacers 123 and 125 integrally rotate with the drive pinion shaft 109 interposed between the bearings 113, 115 and 117.

However, in the differential unit of the related art, an internal diameter of the spacers 123 and 125 is set to a larger value than that of the outer diameter of the drive pinion shaft 109 because the spacers 123 and 125 are rotatably mounted on the drive pinion 109. For this reason, the rotational axis of the drive pinion shaft 109 does not match exactly with the longitudinal axis of the spacers 123 and 125. And when the spacers 123,125 are interposed between the bearings 113, 115 and 117, there is a possibility that the rotational axis C1 of the drive pinion shaft 109 does not match the longitudinal axis C2 of the spacers 123 and 125.

If the spacers are interposed between the bearings in this way, the longitudinal axis of the spacer is offset with the rotational axis of the drive pinion shaft, and the spacers become unbalanced components and imbalance arises with respect to the drive pinion shaft. For example, in the ease where the mass of a spacer is set to 300 g and a difference between the internal diameter of the spacer and the external diameter of the drive pinion shaft is set to 1 mm, the maximum radial offset between the rotational axis of the drive pinion shaft and the longitudinal axis of the spacer is 0.5 mm, and a maximum imbalance of 15 gcm arises.

Because the spacers rotate integrally with the drive pinion shaft, vibrations will arise in the differential unit due to the above described imbalance if the drive pinion shaft rotates, and these transmission vibrations affect vehicle body vibrations.

SUMMARY OF THE INVENTION

The object of the present invention is to provide a differential unit that is capable of reducing an imbalance with respect to a drive pinion shaft.

A differential unit of a first aspect of the present invention is provided with a spacer penetrated in said drive pinion shaft for restricting an installing point of the bearings in the case; and restricting means provided between the spacer and the drive pinion shaft for preventing an irregular gap therebetween in a radial direction so as to avoid a rotational eccentricity of the spacer and the drive pinion shaft and a vibration transmitting to the motor vehicle.

With this differential unit, since there is restricting means for preventing an irregular gap therebetween in a radial direction so as to avoid a rotational eccentricity of the spacer and the drive pinion shaft and a vibration transmitting to the motor vehicle. As a result, it is possible to reduce imbalance with respect to a drive pinion shaft.

A differential unit of a second aspect of the invention, the restricting means is integrally formed in the spacer.

A differential unit of a third aspect of the invention, the restricting means is separately provided between the spacer and the drive pinion.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
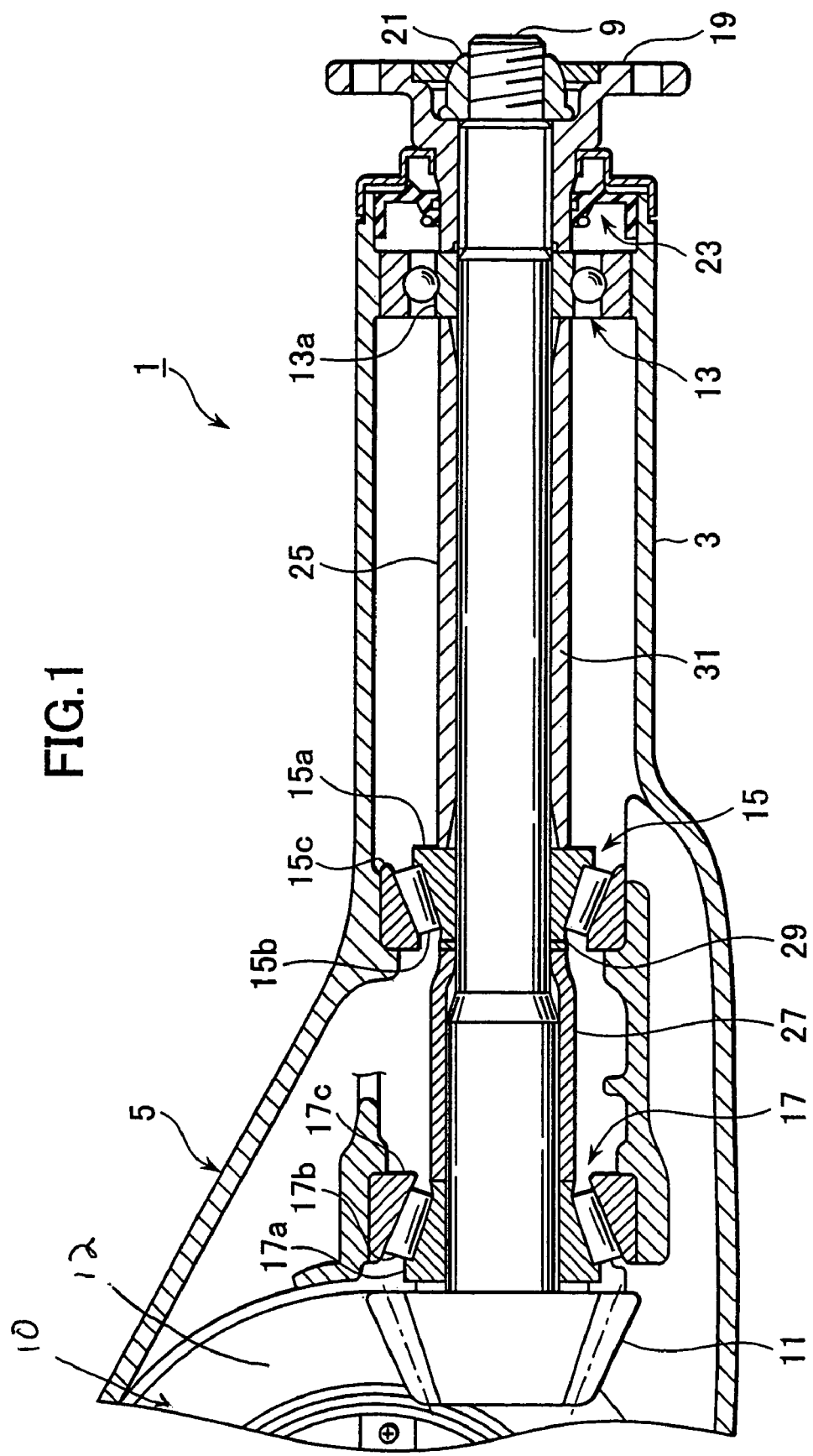
FIG. 1 is a schematic cross sectional drawing showing a differential unit of the present invention.

Preferred embodiments of a differential unit of the present invention will be described in detail by referring to the following drawings. Omitted are the same reference numerals and repeated description.

Figure 2:
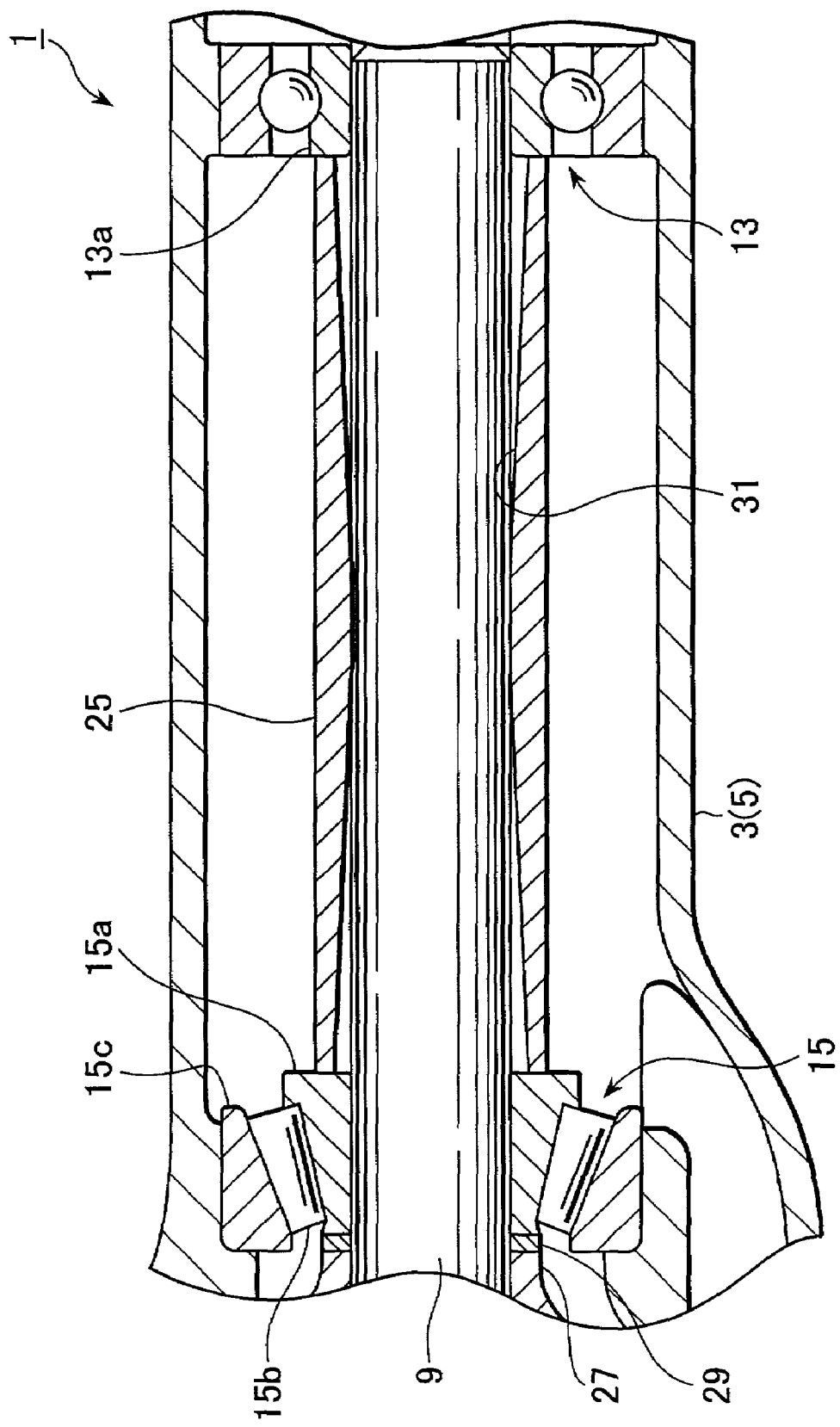
FIG. 2 is the schematic cross sectional drawing showing essential parts of the differential unit shown in FIG. 1.

First, an embodiment of the differential unit according to the present invention will be described with reference to FIGS. 1 and 2. FIG. 1 is a schematic cross sectional drawing showing a differential unit of the embodiment, and FIG. 2 is a schematic cross sectional drawing of essential elements thereof shown in FIG. 1.

As shown in FIG. 1, the differential unit 1 has a case 5 including a differential carrier 3 and a cover (not shown) for closing an opening thereof. A drive pinion shaft 9 is accommodated in a part of the case 5. A drive pinion (bevel pinion) 11 integrally formed on one end of the drive pinion shaft 9, meshes with a driven gear 12 of a differential mechanism 10, which is rotatably supported in the differential carrier 3.

The drive pinion shaft 9 is rotatably supported in the differential carrier 3 by a single pilot bearing 13 and a pair of tapered roller bearings 15 and 17. A companion flange 19 for connecting the drive pinion shaft 9 to a propeller shaft is spline fitted to the other end of the drive pinion shaft 9, and is pressed against an inner race 13a of the pilot bearing 13 by the fastening force of a nut 21. In this way, the companion flange 19 is provided on an input side of the differential unit 1. The inner space of the differential carrier 3 is sealed by an oil seal 23 provided between the differential carrier 3 and the companion flange 19.

A tubular spacer 25 is interposed between the inner race 13a of the pilot bearing and an inner race 15a of the front side tapered roller bearing 15, and a tubular spacer 27 is interposed between the inner race 15a of the front side tapered roller bearing 15 and an inner race 17a of the rear side tapered roller bearing 17 such that the drive pinion shaft 9 is covered with these spacers 25 and 27. The spacers 25 and 27 restrict attachment positions of the pilot bearing 13 and the tapered roller bearings 15 and 17.

An axial force applied to the companion flange 19 by the nut 21 acts on the inner race 15a of the front side tapered roller bearing 15 through the inner race 13a of the pilot bearing 13 and the spacer 25. On the other hand, the axial force applied to the drive pinion shaft 9 by the nut 21 acts on the inner race 17a of the rear side tapered roller bearing 17 through the drive pinion 11. In this way, axial forces in mutually opposite directions respectively acting on the inner races 15a and 17a of the two tapered roller bearings 15 and 17 are received on the one hand by the spacer 27 and adjustment washer 29 interposed between the two inner races 15a and 17a, and received on the other hand by the differential carrier 3 through the respective rollers 15b and 17b and the outer races 15c and 17c. As a result, a precompression force of the same magnitude is supplied to the two tapered roller bearings 15 and 17. The bearing rigidity of the drive pinion shaft 9 is then increased due to this precompression force. And a relative offset between the drive pinion 11 and the driven gear when applied at a load is decreased. Accordingly it becomes possible to maintain an appropriate gear engagement.

In this embodiment, as shown in FIG. 2, a protruding section 31 (position regulating means) protrudes towards the drive pinion shaft 9 at an inner side section facing the drive pinion shaft 9. And the protruding section 31 is integrally formed on the front side spacer 25 interposed between the inner races 13a and 15a. The protruding section 31 is formed in a curved shape so as to be generally convex along the overall central axial direction of the spacer 25, and the cross sectional shape is arched. Also, as the protruding section 31 protrudes towards the drive pinion shaft 9 along the entire inner peripheral direction of the spacer 25 (outer peripheral direction of the drive pinion shaft 9), the inner surface of the protruding section 31 comes into contact with or close to the outer surface of the drive pinion shaft 9. In this way, as the inner surface comes into contact with or close to the outer surface of the drive pinion shaft 9, the rotational axes of the drive pinion shaft 9 and the spacer 25 become substantially aligned, there is little radial offset therebetween.

In this embodiment, since the protruding section 31 facing the drive pinion shaft 9 is provided as radial position regulating means, the radial offset therebetween is reduced by the protruding section 31, the spacer 25 is prevented from becoming an unbalanced element. As a result, it is possible to decrease imbalance arising with respect to the drive pinion shaft 9.

Also, since the protruding section 31 is provided integrally with the spacer 25, there is no need to provide new components as the radial position regulating means, and it becomes possible to reduce the numbers of components and assembly steps. As a result, it is possible to simply minimize the radial offset between the rotational axis of the drive pinion shaft 9 and the longitudinal axis of the spacer 25 at low cost.

Figure 3:
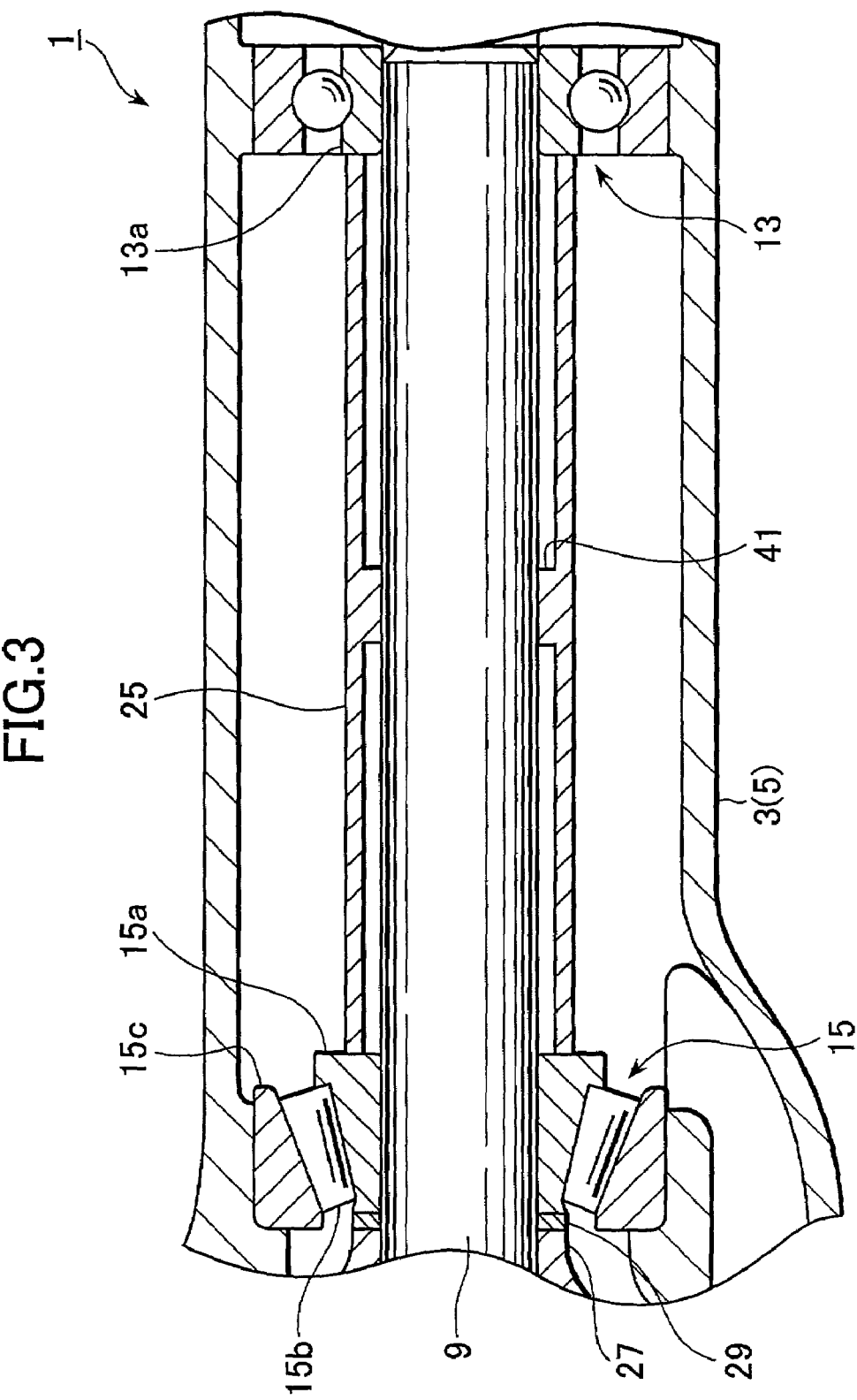
FIG. 3 is the schematic cross sectional drawing showing a modified example of the differential unit of the present invention.

Next modified example will be described by referring to FIG. 3. FIG. 3 is a schematic cross sectional drawing showing essential elements in the modified example. The example shown in FIG. 3 and the embodiment shown in FIG. 2 are different with respect to the shape of the protruding section 31.

As shown in FIG. 3, a protruding section 41 is integrally provided at a specified position in the central axial direction of the spacer 25. For example, the protruding section 41 is at a substantially central position in the central axial direction of the spacer 25. The protruding section 41 is provided to protrude from the inner surface of the drive pinion shaft 9 toward the drive pinion shaft 9 along the entire inner circumferential direction of the spacer 25 (outer circumferential direction of the drive pinion shaft 9) in the same way as shown in FIG. 2. The protruding section 41 is positioned between the drive pinion shaft 9 and the spacer 25, and the inner surface thereof comes into contact with or close to the outer surface of the drive pinion shaft 9. In this way, as the inner surface of the protruding section 41 comes into contact with or close to the outer surface of the drive pinion shaft 9, the rotational axis of the drive pinion shaft 9 and the longitudinal axis of the spacer 25 become substantially aligned, and therefore there is little radial offset between the rotational axis of the drive pinion shaft 9 and the longitudinal axis of the spacer 25.

In this embodiment shown in FIG. 3 the radial offset between the rotational axis of the drive pinion shaft 9 and the longitudinal axis of the spacer 25 is also reduced by the protruding section 41, and therefore it can reduce an imbalance arising with respect to the drive pinion shaft 9. Also, since the protruding section 41 is integrally provided with the spacer 25, similarly to the embodiment shown in FIG. 2, it is possible to simply prevent the radial offset between the rotational axis of the drive pinion shaft 9 and the longitudinal axis of spacer 25 at low cost.

Figure 4:
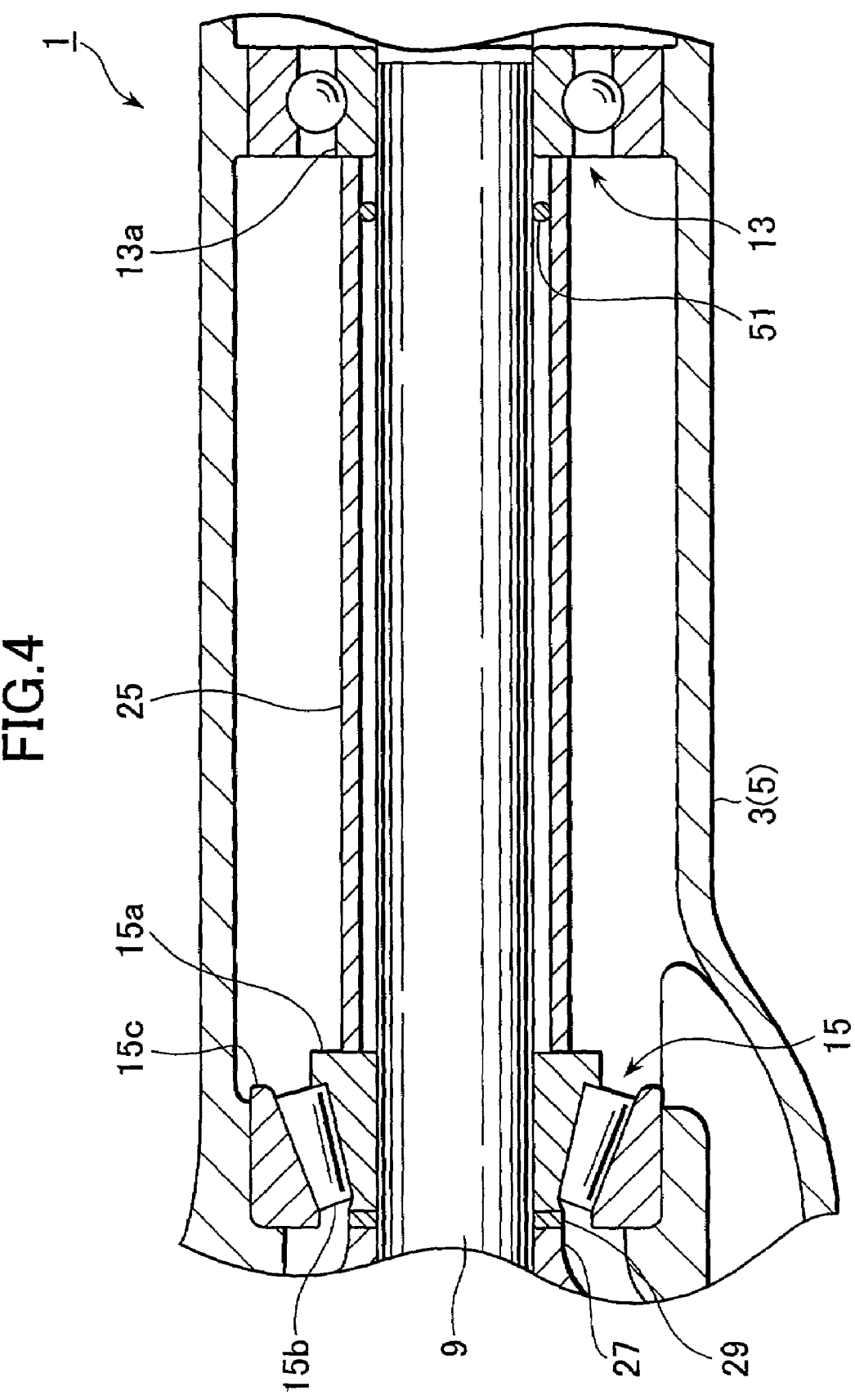
FIG. 4 is the schematic cross sectional drawing showing the essential parts of the modified example of the present invention.

Next modified example will be described based on FIG. 4. FIG. 4 is a schematic cross sectional drawing showing the essential elements in the modified example shown in FIG. 4. The modified example shown in FIG. 4 and the embodiment shown in FIG. 2 are different in that the radial position regulating means is provided separately from the spacer.

An O-ring 51 (radial position regulating means) is provided between the spacer 25 and the drive pinion shaft 9 as shown in FIG. 4. The O-ring 51 is arranged in the vicinity of an end section of the spacer 25 close to the tapered roller bearing 13. The O-ring 51 is made from metal or rubber.

The O-ring 51 contacts with the outer surface of the drive pinion shaft 9 and the inner surface of the spacer 25. In this way, the rotational axis of the drive pinion shaft 9 and the longitudinal axis of the spacer 25 become substantially aligned due to the fact that the O-ring 51 contacts with the outer surface of the drive pinion shaft 9 and the inner surface of the spacer 25, and therefore there is little radial offset between the rotational axis of the drive pinion shaft 9 and the longitudinal axis of the spacer 25.

In this modified shown in FIG. 4, since there is the O-ring 51 between the spacer 25 and the drive pinion shaft 9 as radial position regulating means, the radial offset between the rotational axis of the drive pinion shaft 9 and the longitudinal axis of the spacer 25 is reduced by this O-ring 51, and the spacer 25 is prevented from becoming an unbalanced element. As a result, it is possible to decrease imbalance arising with respect to the drive pinion shaft 9.

Also, since the O-ring 51 is provided separately from the spacer 25, there is no need for design modifications accompanying change in shapes of the spacer 25. And it is simply possible to realize a structure for preventing the radial offset between the rotational axis of the drive pinion shaft 9 and the longitudinal axis of the spacer 25 at low cost.

Figure 5:
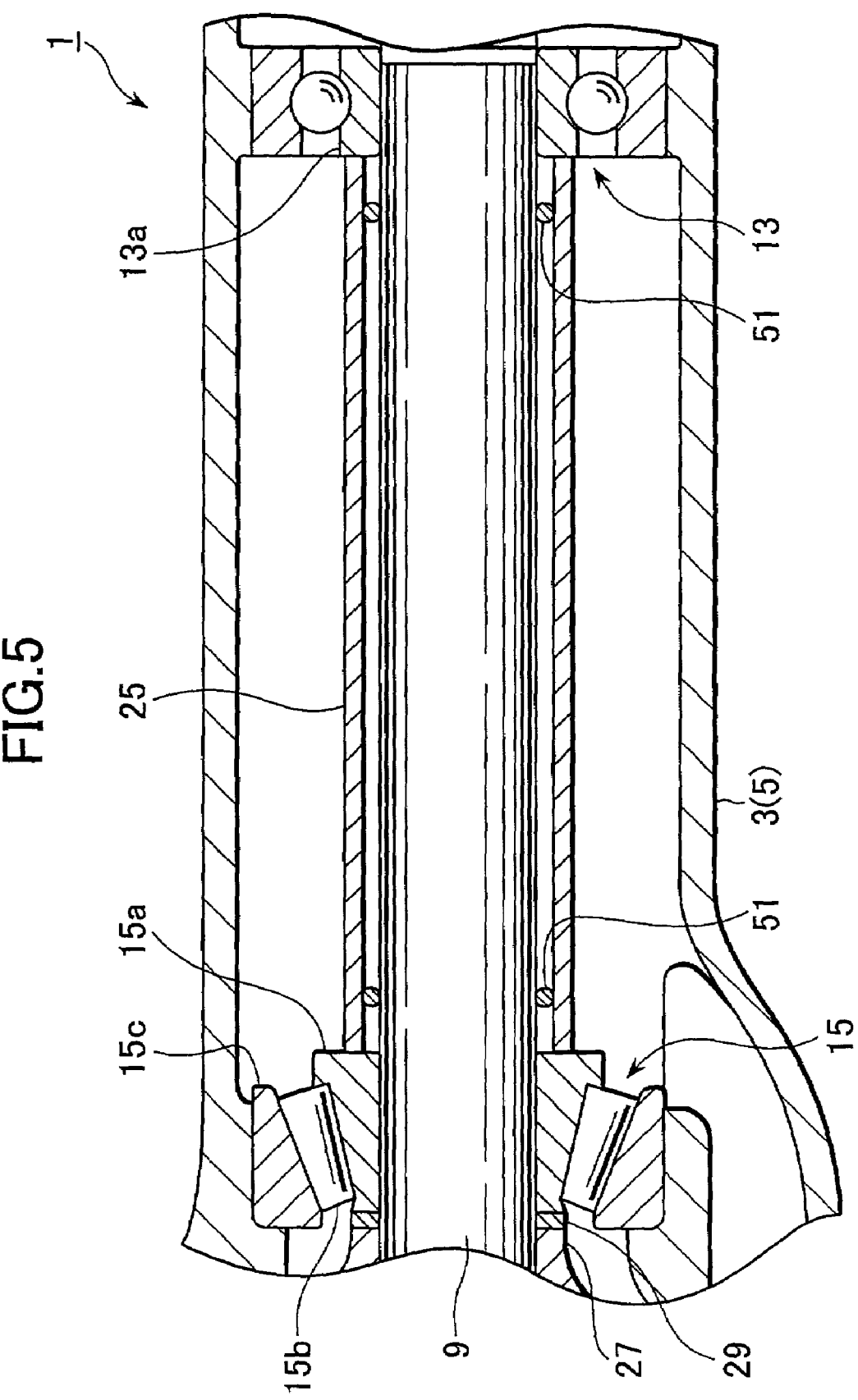
FIG. 5 is the schematic cross sectional drawing showing the essential parts of the modified example of the present invention.
Figure 6:
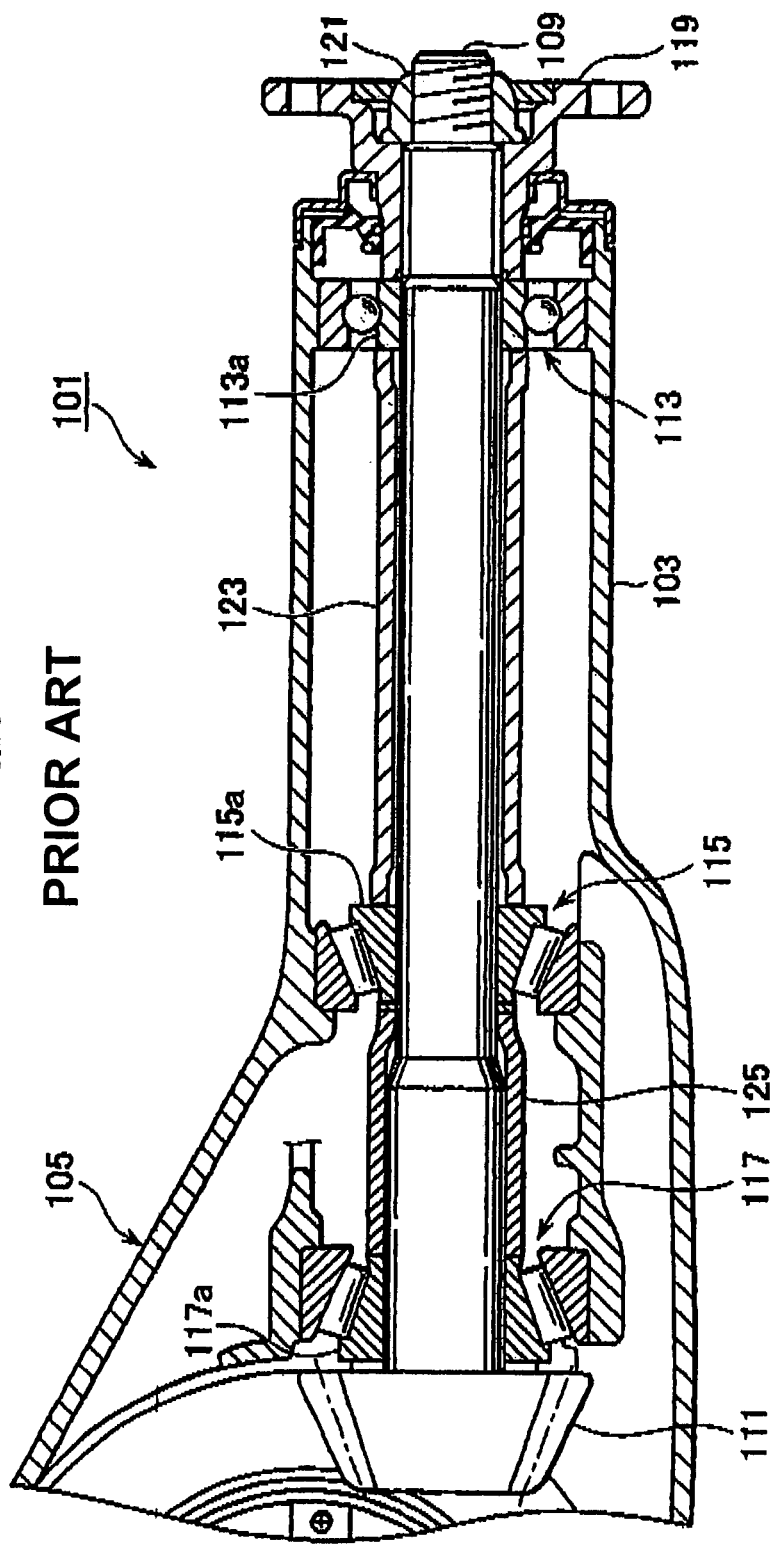
FIG. 6 is the schematic cross sectional drawing showing a differential unit of the prior art.
Figure 7:
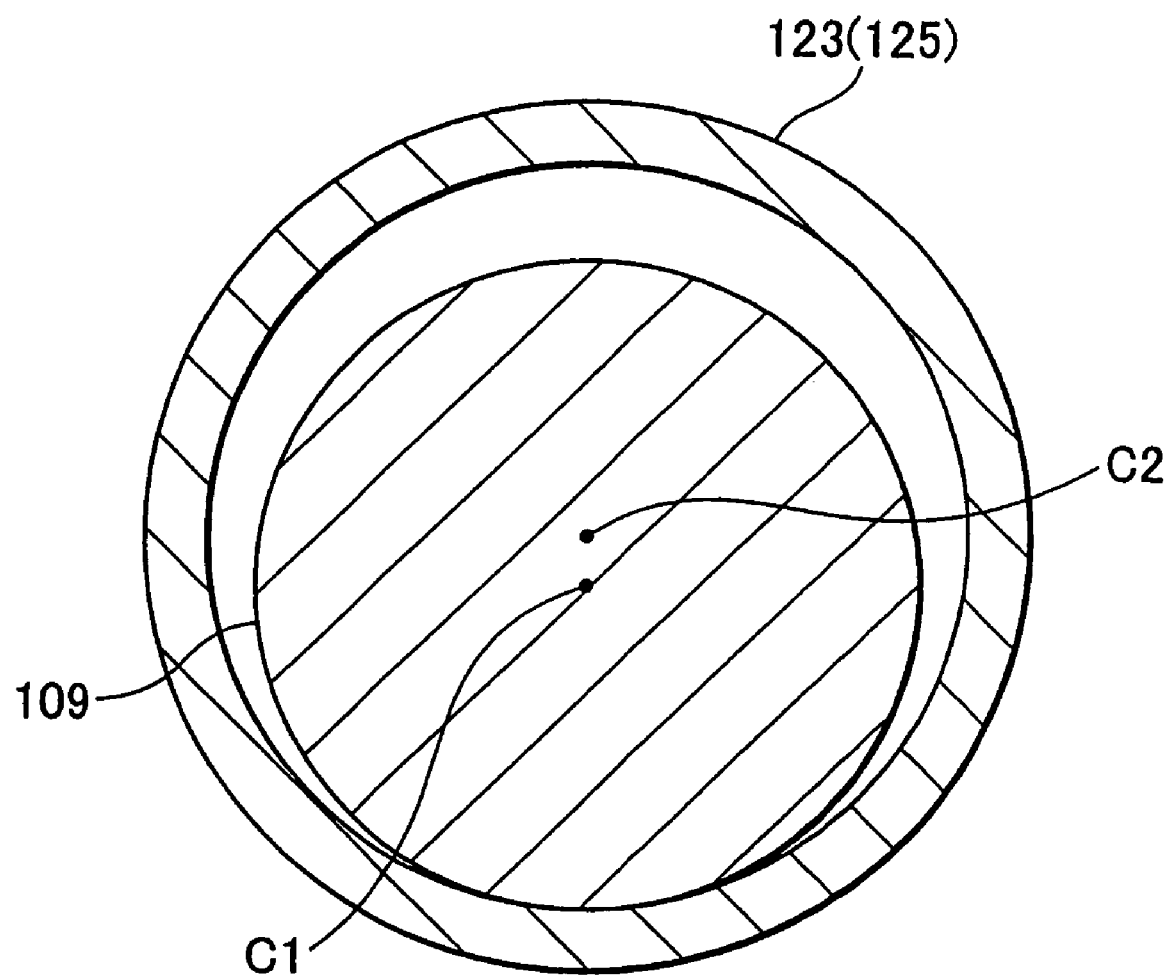
FIG. 7 is the cross sectional view of a drive pinion shaft and a spacer shown in FIG. 6.

Next example of the differential unit of this embodiment will be described based on FIG. 5. FIG. 5 is a schematic cross sectional drawing showing essential parts in the modified example of this embodiment. The modified example shown in FIG. 5 and the modified example shown in FIG. 4 are different with regards to the number of O-rings and the positions at which the O-rings are arranged.

O-rings 51 are arranged at two positions in the vicinity of one end of the spacer 25 close to the tapered roller bearing 13 and in the vicinity of the other end of the spacer 25 close to the tapered roller bearing 15. By thus providing the O-rings 51 in a pair in the vicinity of the two ends of the spacer 25, it is possible to drastically reduce the radial offset between the rotational axis of the drive pinion shaft 9 and the longitudinal axis of the spacer 25.

In this modified example of this embodiment shown in FIG. 5, since there are a plurality of O-rings 51 (a pair in the vicinity of the two ends of the 25) between the spacer 25 and the drive pinion shaft 9 as a radial position regulating means, the radial offset between the rotational axis of the drive pinion shaft 9 and the longitudinal axis of the spacer 25 is drastically reduced by the O-rings 51. And the spacer 25 is reliably prevented from becoming an unbalanced element.

As a result, it is possible to more drastically reduce the imbalance arising with respect to the drive pinion shaft 9. Also, since the O-rings 51 are provided separately from the spacer 25 in the same way as to the modified example shown in FIG. 4, it is simply possible to prevent radial offset between the rotational axis of the drive pinion shaft 9 and the longitudinal axis of the spacer 25 at low cost.

The present invention is not limited to the above described embodiment. For example, a structure is possible having the position regulating means (such as the protruding section 31 or the O-ring 51) between the rear side spacer 27 interposed between the inner races of the pair of the tapered roller bearings 15 and 17, and the drive pinion shaft 9.

Also, in the embodiments shown in FIGS. 2 and 3, the protruding sections 31 and 41 are provided so as to protrude towards the drive pinion shaft 9 along the entire inner direction of the spacer 25 (outer direction of the drive pinion shaft 9), but there is no limiting in that way. It is also possible to have the structure with the protruding sections 31 or 41 provided at the specified places on the inner peripheral direction of the spacer 25 (outer peripheral direction of the drive pinion shat 9) at three places spaced 120° apart or at 4 places space 90° apart, as long as the radial offset between the rotational axis of the drive pinion shaft 9 and the longitudinal axis of the spacer 25 is reduced.

Also, the unit provided with the protruding section 31 or 41 is not limited to being positioned substantially centrally in the axial center direction, and it is possible to be positioned at the end of the spacer 25 in a central axial direction. It is possible to provide the protruding sections respectively at both ends of the spacer in the central axial direction.

In the differential unit of the present invention, since there is the position regulating means between the drive pinion shaft and the spacer, the radial offset between the rotational axis of the pinion shaft and the spacer is reduced, and the longitudinal axis of the spacer is prevented from becoming unbalanced. Accordingly, it is possible to provide the differential unit capable of reducing imbalance arising with respect to the drive pinion shaft.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A differential unit of a motor vehicle for transmitting a driving force to a pair of driving wheels while absorbing a rotational difference there between, comprising:
   a case;
   a differential mechanism accommodated in the case;
   a drive pinion shaft for transmitting the driving force to the differential mechanism, said drive pinion shaft rotatably supported in the case with at least two bearings; and
   a tubular spacer having an inner diameter larger than an outer diameter of the drive pinion shaft, said spacer interposed between the bearings such that the spacer covers the drive pinion shaft; and
   said tubular spacer has at least one protruding section on an inner surface thereof to protrude in a radial direction toward the drive pinion shaft, said protruding section being formed to extend along an inner peripheral direction of the tubular spacer and to have a cross sectional shape which is convex along a central axis of the tubular spacer so that an innermost surface of the protruding section facing the shaft is arched; and
   wherein said protruding section extends along an entire inner peripheral direction of the tubular spacer; and
   wherein said tubular spacer has a greater cross section thickness at said protruding section.

2. The differential unit according to claim 1, wherein said protruding section is configured so that said innermost surface of the protruding section is close to an outer surface of the drive pinion shaft.

3. The differential unit according to claim 1, wherein said protruding section is configured so that said innermost surface of the protruding section contacts with an outer surface of the drive pinion shaft.

4. The differential unit according to claim 1, wherein said protruding section is disposed at a central position along a central axial direction of the tubular spacer.

5. The differential unit according to claim 1, wherein said bearings positioned to opposite sides of said tubular spacer are non-identical.

6. The differential unit according to claim 5, wherein a first of said bearings is a ball bearing and a second of said bearings is a tapered roller bearing.

7. The differential unit according to claim 1, wherein said protruding section is integrally formed on the innermost surface of the spacer.

8. The differential unit according to claim 7, wherein said protruding section and the spacer are monolithic.

9. The differential unit according to claim 1, further comprising:
   a third bearing; and
   a second tubular spacer disposed in between one of said at least two bearings and said third bearing.

10. The differential unit according to claim 1, wherein said two bearings have an inner race respectively and said spacer is interposed between the inner races of said two bearings.

11. The differential unit according to claim 1, wherein said at least one protruding section is positioned closer to a central region of said tubular spacer than an end region of said tubular spacer.

12. A differential unit of a motor vehicle for transmitting a driving force to a pair of driving wheels while absorbing a rotational difference there between, comprising:
- a case;
- a differential mechanism accommodated in the case;
- a drive pinion shaft for transmitting the driving force to the differential mechanism, said drive pinion shaft rotatably supported in the case with at least two bearings; and
- a tubular spacer having an inner diameter larger than an outer diameter of the drive pinion shaft, said spacer interposed between the bearings such that the spacer covers the drive pinion shaft; and
- said tubular spacer has at least one protruding section on an inner surface thereof to protrude in a radial direction toward the drive pinion shaft, said protruding section being formed to extend along an inner peripheral direction of the tubular spacer and to have a cross sectional shape which is convex along a central axis of the tubular spacer so that an innermost surface of the protruding section facing the shaft is arched; along the entire length of said tubular spacer and
- wherein said protruding section is disposed at a central position along a central axial direction of the tubular spacer.

13. A differential unit of a motor vehicle for transmitting a driving force to a pair of driving wheels while absorbing a rotational difference therebetween, comprising:
- a case;
- a differential mechanism accommodated in the case;
- a drive pinion shaft for transmitting the driving force to the differential mechanism, said drive pinion shaft rotatably supported in the case with at least two bearings having an inner race, respectively; and
- a tubular spacer having an inner diameter larger than an outer diameter of the drive pinion shaft, said spacer interposed between the inner races of the bearings such that the spacer covers the drive pinion shaft; and
- said tubular spacer has at least one protruding section on an inner surface thereof to protrude in a radial direction toward the drive pinion shaft, said protruding section being formed to extend along an inner peripheral direction of the tubular spacer and to have a cross sectional shape which is convex along a central axis of the tubular spacer so that an inner surface of the protruding section is arched along the entire length of said tubular spacer and
- wherein said protruding section is disposed at a central position along a central axial direction of the tubular spacer.

14. The differential unit according to claim 13, wherein said protruding section is integrally formed on the innermost surface of the spacer.

* * * * *